(12) United States Patent
Robbins

(10) Patent No.: US 6,962,080 B2
(45) Date of Patent: Nov. 8, 2005

(54) ROTOR BALANCING AND DRIVE SHAFT SIMULATOR THEREFOR

(75) Inventor: William E Robbins, Bristol (GB)

(73) Assignee: Rolls-Royce plc, London (GB)

(*) Notice: Subject to any disclaimer, the term of this patent is extended or adjusted under 35 U.S.C. 154(b) by 29 days.

(21) Appl. No.: 10/720,376

(22) Filed: Nov. 25, 2003

(65) Prior Publication Data

US 2004/0134276 A1    Jul. 15, 2004

(30) Foreign Application Priority Data

Jan. 14, 2003  (GB) .................................. 0300768

(51) Int. Cl.⁷ .............................................. G01M 1/16
(52) U.S. Cl. .............................. 73/460; 73/66; 73/487; 73/866.4
(58) Field of Search .......................... 73/66, 460, 462, 73/468–470, 467, 866.4

(56) References Cited

U.S. PATENT DOCUMENTS

| 3,871,234 | A | | 3/1975 | Langlois | |
|---|---|---|---|---|---|
| 5,367,909 | A | * | 11/1994 | Heilman et al. | 73/468 |
| 5,922,952 | A | * | 7/1999 | Moradi et al. | 73/462 |
| 2004/0226368 | A1 | * | 11/2004 | Nieman et al. | 73/462 |

FOREIGN PATENT DOCUMENTS

GB          2 356 030 A      5/2001

* cited by examiner

*Primary Examiner*—Hezron Williams
*Assistant Examiner*—John C Hanley
(74) *Attorney, Agent, or Firm*—Oliff & Berridge, PLC

(57) ABSTRACT

A method of balancing a rotary device (12,14) for balanced rotational operation when connected to a drive shaft (24) by a flexible coupling (26,28). The method comprises the steps of connecting a drive shaft simulator (32,34) to a rotary device (12,14) and, rotating the said device (12,14) to simulate drive shaft unbalance due to misalignment of the rotary device (12,14) and the drive shaft (24) being simulated when the drive shaft (24) and rotary device (12,14) are connected together.

8 Claims, 3 Drawing Sheets

ROTOR BALANCING AND DRIVE SHAFT SIMULATOR THEREFOR

This invention relates to a method of balancing a rotary device for balanced operation when connected to a drive shaft by a flexible coupling, and in particular the invention concerns the use of drive shaft simulators to simulate the effect of the drive shaft on the rotary device during balancing.

Rotary devices such as engines and the auxiliary units that are connected to engines by drive shafts are usually balanced individually with drive shaft simulators to compensate for geometric errors, for example swash and eccentricity, due to misalignment of the rotational axes of the respective rotary devices when connected together by the drive shaft. Balancing of the individual devices provides for interchangeability of the devices so that a modular approach to a manufacture may be employed, that is to say, in theory it should be possible to connect any individually balanced rotary devices by means of a transmission drive shaft without introducing unbalance in the assembled rotary system.

In one method currently employed, drive shaft simulators are rigidly attached to the rotary device to be balanced. This approach introduces errors since the drive shaft being simulated, when assembled with the rotary device, is usually connected to the rotary device via a flexible coupling, with the axis of rotation of the drive shaft being determined by the eccentricity of the drive shaft location features on the rotary devices being connected. This arrangement does not take into account the angular alignment, or swash, of the drive shaft being simulated when connecting the two rotary devices. In this way the drive shaft simulators do not replicate the actual axis of rotation of the installed drive shaft being simulated and hence the simulated unbalance.

In known methods the drive shaft simulators are designed so that the mass, centre of gravity and inertia of the drive shaft simulator is the same as the drive shaft being simulated.

The present inventor has recognised that the use of such drive shaft simulators in the above-mentioned method to simulate drive shafts with flexible coupling can lead to increased vibration in the balanced rotary device since the drive shaft simulators do not replicate the actual axis of rotation of the installed drive shaft being simulated because of the effect of the flexible couplings. In this way the drive shaft simulators incorrectly simulated unbalance. This can lead to increased vibration which may require the rotary device and assembled system to be rebalanced, and in extreme cases can lead to rotor failure due to excessive vibration.

According to an aspect of the invention there is provided a method of balancing a rotary device for balanced rotational operation when connected to a drive shaft by a flexible coupling; the said method comprising the steps of connecting a drive shaft simulator to the said rotary device and rotating the said device to simulate drive shaft unbalance due to misalignment of the rotary device and the drive shaft being simulated when the drive shaft and rotary device are connected together.

The present inventor has found that it is possible to correctly simulate drive shaft unbalance due to misalignment of the rotary device with respect to the drive shaft being simulated by determining appropriate drive shaft simulator parameters, that is to say the misalignment that occurs in practice due to geometric tolerances and accommodated by the use of flexible couplings. The inventor has shown by rigorous mathematical analysis it is possible to replicate the effects of the drive shaft and flexible coupling in a balancing method where the axis of rotation is the axis of the rotary device. This method therefore overcomes at least in part the problem of rotor and drive shaft balancing using drive shaft simulators which do not correctly replicate the dynamic effects of the drive shaft being simulated as a result of the drive shaft having a slightly different axis of rotation to that of the rotary device when connected together.

The step of stimulating drive shaft unbalance preferably comprises the step of simulating unbalance due to drive shaft eccentricity and/or angular misalignment with respect to the axis of the rotary device.

Preferably, the mass of the drive shaft simulator is substantially half the mass of the drive shaft to be simulated. By having the mass of the drive shaft simulator substantially equal to half the mass of the drive shaft being simulated, the drive shaft unbalance due to the effects of drive shaft eccentricity can be correctly simulated in the balancing method according to embodiments of the invention. This is a significant developments in the art of balancing rotary devices since hitherto established practice has involved the use of full mass drive shaft simulators, that is drive shaft simulators having a mass substantially equal to that of the drive shaft being simulated. The present inventor has found by fundamental mathematical analysis that the effects of eccentricity can be correctly simulated by using half mass drive shaft simulators in the balancing method disclosed herein.

Preferably, the said drive shaft simulator has a polar moment of inertia substantially equal to its diametral moment of inertia and is positioned with respect to the rotary device such that its centre of gravity is substantially coincident with the plane of flexibility of the flexible coupling, which in use, connects the rotary device to the drive shaft being simulated, whereby to simulate the effect of angular misalignment of the drive shaft being simulated with respect to the axis of the rotary device. The present inventor has demonstrated that by connecting the drive shaft simulator to the rotary device being balanced such that the centre of gravity of the drive shaft simulator is coincident with the interface plane or plane of flexibility between the rotor and drive shaft being simulated, and designing the simulated drive shaft such that its polar moment of inertia and diametral moment of inertia are equal, the drive shaft unbalance due to swash at the interface of the rotary device and drive shaft arising from angular misalignment can be correctly simulated.

In preferred embodiments, the method further comprises the step of determining the balancing correction to be applied to the rotary device for balanced operation of the rotary device when connected to a drive shaft of the type being simulated by a flexible coupling. This provides for balanced operation in use and readily permits interchangeability of rotary device and drive shaft components for maintenance purposes and the like when connected together in a power transmission system.

Preferably the rotary device comprises an engine or a device driven by an engine via a transmission including for example a drive shaft of the type being simulated. The term "rotary device" used herein, therefore, contemplates embodiments where the rotary device is an engine, having a power output shaft for instance, or an auxiliary device that is driven by power from the engine and having its own rotary components.

In one embodiment the rotary device comprises a gas turbine engine or module thereof, or an auxiliary device to be driven by the engine or engine module via a drive shaft of the type being simulated. The invention therefore contemplates embodiments where the auxiliary rotary device comprises an oil pump, a fuel pump, an alternator or a lift fan, for example, where the engine is an aero gas turbine engine. In industrial gas turbine engine applications power take-off shafts are commonly used for driving alternators either directly or indirectly via a gearbox, and in marine gas turbine engine applications power take-off shafts are used for driving propeller shafts, directly or indirectly via a gearbox or for driving alternators. The method of the present invention is applicable to other fields of technology and may be employed to correctly simulate drive shaft behaviour in balancing methods where it is necessary to balance individual rotary devices that are to be connected to a respective end of a drive shaft by means of a flexible coupling, and therefore the invention finds particular application wherever correct balancing of rotary devices in modular component systems is important.

According to another aspect of the invention there is provided a method of balancing a rotary device for balanced rotational operation in a rotary device and drive shaft assembly in which a drive shaft is connected to a rotary device by a flexible coupling; the said method comprising the steps of connecting a drive shaft simulator to the said rotary device; the drive shaft simulator having substantially half the mass of the drive shaft to be simulated and a polar moment of inertia substantially equal to its diametral moment of inertia, the drive shaft simulator being positioned with respect to the rotary device such that its centre of gravity is substantially coincident with the plane of flexibility of a flexible coupling, which in use, connects the rotary device to the drive shaft being simulated, whereby to determine a balancing correction to be applied to the said rotary device for balanced operation when connected to a drive shaft of the type being simulated by a flexible coupling.

According to a further aspect of the invention there is provided a drive shaft simulator for use in a method of balancing a rotary device for balanced rotational operation when connected to a drive shaft by a flexible coupling; the said drive shaft simulator having substantially half the mass of the drive shaft to be simulated.

According to another aspect of the invention there is provided a drive shaft balancing simulator for use in a method of balancing a rotary device for balanced rotational operation when connected to a drive shaft by a flexible coupling; the drive shaft simulator having a polar moment of inertia substantially equal to its diametral moment of inertia.

According to another aspect of the invention there is provided a drive shaft balancing simulator for use in a method of balancing a rotary device for balanced rotational operation when connected to a drive shaft by a flexible coupling; the said drive shaft simulator having substantially half the mass of the drive shaft to be simulated and a polar moment of inertia substantially equal to its diametral moment of inertia.

An embodiment of the invention will now be more particularly described, by way of example only with reference to the accompanying drawings in which.

Figure 1:
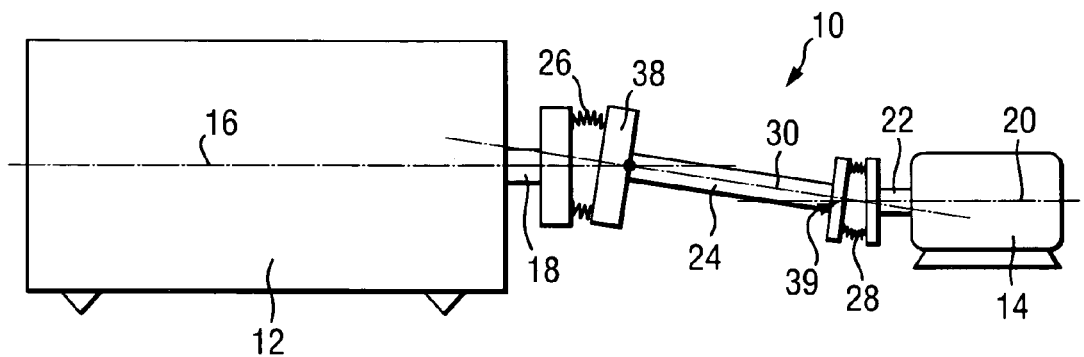
FIG. 1 is a schematic representation of an engine and auxiliary unit connected together by means of a drive shaft and flexible couplings.

Referring to FIG. 1, which shows a transmission system 10 connecting a first rotary device 12, for example an engine which may be a gas turbine engine, to an auxiliary rotary device 14. In the arrangement the engine has an axis of rotation 16 which defines the axis of rotation of an engine output shaft 18. The auxiliary rotary device 14 also has an axis of rotation 20 which defines the axis of rotation of an input shaft 22. The auxiliary device 14 may be an oil pump, fuel pump, alternator or any other device that is capable of being driven by the engine 12. The engine and auxiliary devices are connected together by means of a drive shaft 24 and respective flexible couplings 26 and 28 which connect to the engine and auxiliary device respectively. In the drawing of FIG. 1 the engine axis 16 and auxiliary axis 20 are slightly misaligned due to build tolerances and the like and hence the drive shaft 24 has an axis 30 which is inclined with respect to both the axis 16 and 20. The angular misalignment of the drive shaft axis 13 with respect to the engine and auxiliary axes is accommodated by the flexible couplings 26 and 28 at the ends of the drive shaft.

The arrangement of FIG. 1 is typical of any transmission system where a drive shaft is used to connect an engine or other rotary prime mover type device to a driven device such as the auxiliary unit 14 in the drawings of FIG. 1. This arrangement is commonly found in gas turbine engine arrangements where engine auxiliary devices such as oil pumps, fuel pumps, etc, are connected to the engine by means of a radial drive shaft.

Figure 2:
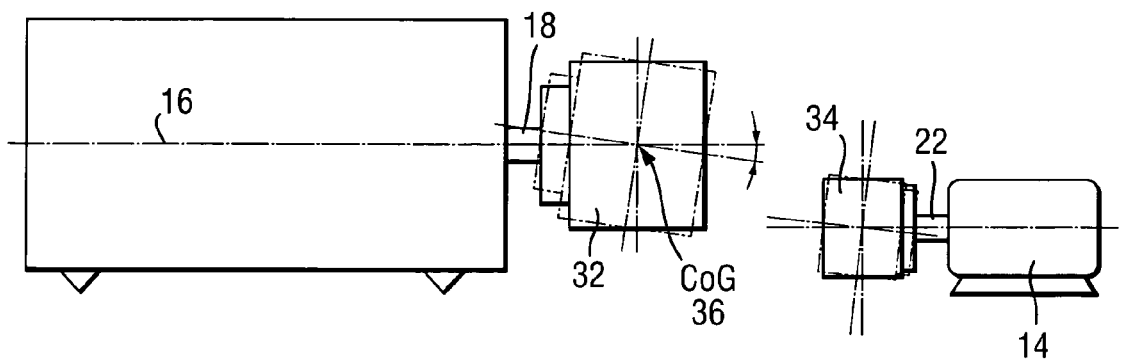
FIG. 2 is a schematic representation of the engine and auxiliary unit of FIG. 1 configured for balancing with appropriate drive shaft simulators.

Referring now to FIG. 2, in a method of balancing the rotary devices 12 and 14 so that they are individually balanced for interchangeability purposes, the engine drive shaft interface 18 is connected to a first drive shaft simulator 32 which simulates the effect of the drive shaft 24 on the engine during balancing, and similarly a drive shaft simulator 34 is connected to the input drive shaft interface 22 of the auxiliary unit 14. The drive shaft simulators 32 and 34 have a mass equal to half that of the drive shaft 24 such that the combined mass of the drive shaft simulators 32 and 34 is equal to the mass of the drive shaft 24. For both drive shaft simulators 32 and 34 the polar moment of inertia is equal to the diametral moment of inertia of that simulator. The drive shaft simulator 32 is connected to the engine interface shaft 18 in such a way that its centre of gravity 36 is positioned coincident with the plane of flexibility of the flexible coupling 26 at one end of the drive shaft, as defined by the plane perpendicular to the engine axis 16 at the point of intersection 38 with the drive shaft axis 30 at the drive shaft interface of coupling 26. Positioning the centre of gravity of the drive shaft simulator 32 so that it is coincident with the plane of flexibility of the drive shaft coupling 26 enables the effect of the drive shaft 24 to be correctly simulated when the engine and drive shaft simulator 32 are rotated about the engine axis 16. This occurs despite the fact that the drive shaft being simulated is angled with respect to the axis 16 in the arrangement of FIG. 1. This will be more clearly appreciated from the mathematical analysis of the system that is to follow. It is to be understood that the drive shaft simulator 34 is connected to the auxiliary rotary unit 14 in the same way to that of simulator 32, in the sense that its centre of gravity is positioned coincident with the plane of flexibility defined by the plane perpendicular to the auxiliary axis 20 positioned at the point of intersection 39 between the drive shaft axis 30 and auxiliary axis 20.

In the balancing method of the invention the engine 12 and simulator drive shaft 32 are rotated about the engine axis 16 in order to simulate the effects of the drive shaft 24. This enables a balancing correction to be determined and applied to the rotating components of the engine 16 for the purpose of interchangeability, and similarly for the auxiliary unit 14.

There now follows a description of the mathematical analysis which demonstrates the theory which underlies aspects of the present invention. First, reference is made to correctly simulating the effects of drive shaft eccentricity, and second the effects of simulating drive shaft unbalance due to the effects of swash. In the context of the present description the term "swash" refers to the angular misalignment of the drive shaft 24 being simulated with respect to the axis of rotation of the rotary device to be balanced, that is to say engine axis 16 or auxiliary axis 20.

Eccentricity

Figure 3:
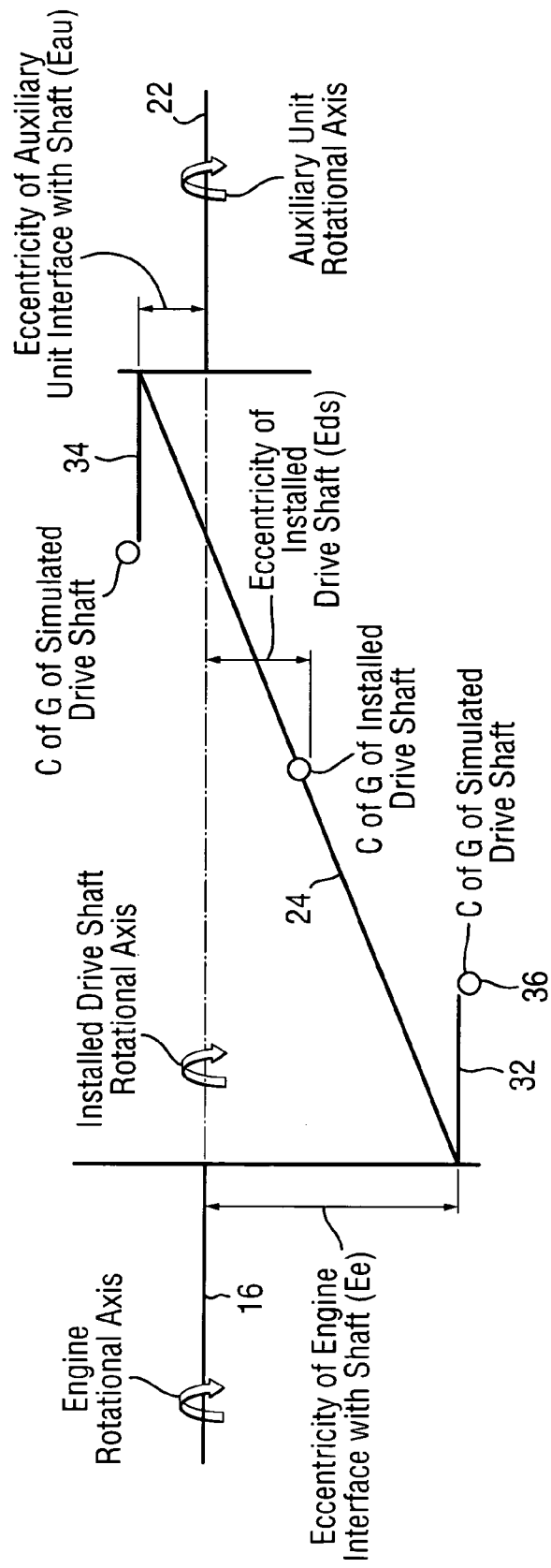
FIG. 3 is a schematic representation of the components shown in FIG. 1 showing various rotary device and drive shaft parameters for determining simulated unbalance due to eccentricity of drive shaft location features on the engine and auxiliary unit.

Referring now to FIG. 3, interchangeability is achieved by making eccentric unbalance simulated by both engine and auxiliary unit drive shaft locations equal to that of the installed drive shaft. This can be represented by the following vector equations;

$$UEeau = UEe + UEau$$

Where:

UEeau=Drive Shaft Unbalance due to eccentricity of location features on the engine and auxiliary unit.
UEe=Simulated drive shaft unbalance due to eccentricity of location features on the engine.
UEae=Simulated drive shaft unbalance due to eccentricity of location features on the auxiliary unit.
Assuming ridged rotor theory applies.
With reference to FIG. 3;

$$UEeau = Mds \times Eds$$

$$UEe = Ms \times Ee$$

$$UEau = Ms \times Eau$$

Where the following definitions are vector quantities:
Mds=Mass of the drive shaft
Eds=Eccentricity of installed drive shaft CofG
Ms=Mass of the drive shaft simulator/s
Ee=Eccentricity of drive shaft simulator due to engine location feature
Eau=Eccentricity of drive shaft simulator due to auxiliary unit location feature $$Eds = [\{Ee + Eau\}/2] - Eau$$

$$Eds = Ee/2 + Eau/2 - Eau$$

$$Eds = Ee/2 - Eau/2$$

$$2Eds = Ee - Eau$$

Therefore $$UEeau = UEe + UEau$$

$$Mds \times Eds = Ms \times Ee + Ms \times Eau$$

$$Mds \times Eds = Ms \times Ee - Ms \times Eau$$

$$Mds \times Eds = Ms[Ee - Eau]$$

Substitute Ee−Eau=2Eds $$Mds \times Eds = 2Eds Ms$$

$$Ms = Mds/2$$

In summary, the mass of the drive shaft simulators 32, 34 must each equal half the mass of the drive shaft to accurately simulate drive shaft unbalance due to eccentricity of engine and auxiliary unit drive shaft location features.

Swash

Figure 4:
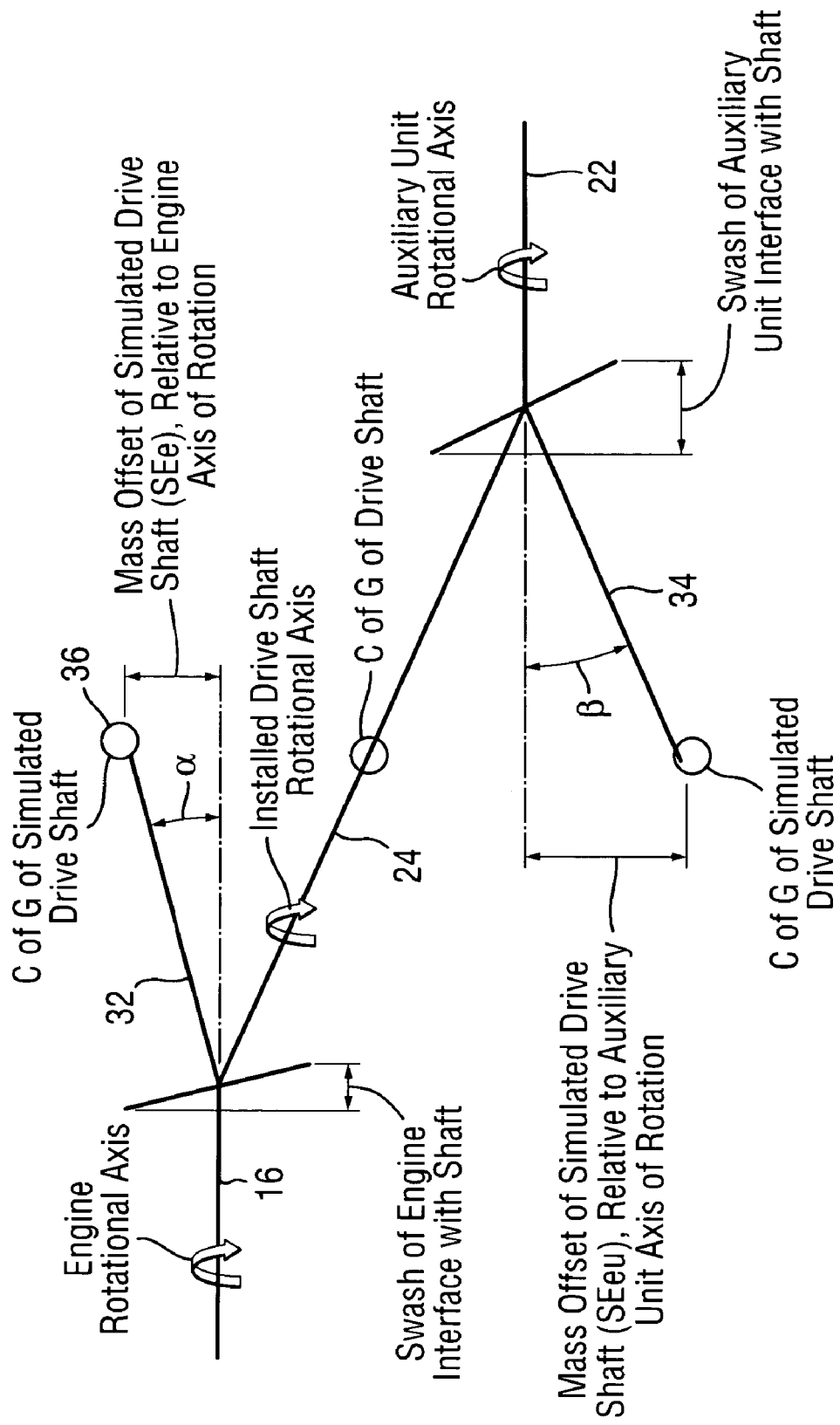
FIG. 4 is a schematic representation similar to that of FIG. 3 showing various parameters for determining simulated unbalance due to swash (angular misalignment) of drive shaft location features on the engine and auxiliary units.

Referring to FIG. 4, interchangeability is achieved by making swash unbalance simulated by both engine and auxiliary unit drive shaft locations equal to that of the installed drive shaft. This can be represented by the following vector equations:

$$USeau = USe + USau$$

where

USeau=Drive Shaft Unbalance due to swash of location features on the engine and auxiliary unit.
USe=Simulated drive shaft unbalance due to swash of location features on the engine.
USau=Simulated drive shaft unbalance due to swash of location features on the auxiliary unit.
Assuming ridged rotor theory applies.
With reference to FIG. 4

$$USeau = [M \times SEds] + \{\delta[Ipds - Idds]\}$$

$$USe = [Ms \times SEe] + \{\alpha[Ip - Id]\}$$

$$USau = [Ms \times SEau] + \{\beta[Ip - Id]\}$$

Where the following definitions are vector quantities:
M=Mass of drive shaft
SEds=Eccentricity of installed drive shaft due to swash of engine and auxiliary unit Interfaces
δ=Swash angle of installed drive shaft 'axis of rotation' relative to that of the shaft, auxiliary unit and engine, combined, in radians
Ipds=Polar moment of inertia of drive shaft
Idds=Diametral moment of inertia of drive shaft
Ms=Mass of drive shaft simulator
SEe=Eccentricity of simulated drive shaft due to swash of engine Interface
α=Swash angle of simulated drive shaft 'axis of rotation' relative to that of the engine, in radians
Ip=Polar moment of inertia of simulated drive shaft
Id=Diametral moment of inertia of simulated drive shaft
SEau=Eccentricity of simulated drive shaft due to swash of auxiliary unit Interface
β=Swash angle of simulated drive shaft 'axis of rotation' relative to that of the auxiliary unit, in radians.

For the installed drive shaft 67 equals zero due to the effect of the flexible couplings. With δ equal to zero SEds also equals zero.

$$USeau = [M \times SEds] + \{\delta[Ipds - Idds]\}$$

$$USeau = [M \times 0] + \{0[Ipds - Idds]\}$$

$$USeau = 0$$

From USeau=USe+USau, USe and USau must equal zero.

$$USe = [Ms \times SEe] + \{\alpha[Ip - Id]\} = 0 \text{ and}$$

$$USau = [Ms \times SEau] + \{\beta[Ip - Id]\} = 0$$

By making the simulated drive shaft CofG coincide with the plane of flexibility between engine/auxiliary unit and the simulated drive shaft, both SEe and SEau will equal zero and hence eccentricity due to swash will be equal to zero. The plane of flexibility is defined by the plane perpendicular to the engine/auxiliary unit 16,20 at the point of intersection 38,39 between the drive shaft axis 30 and engine/auxiliary unit 16,20.

By making the drive shaft simulator inertia's, Ip and Id, equal to each other, couple unbalance due to swash will equal zero.

In summary, the CofG of the drive shaft simulator must coincide with the plane of flexibility between engine/auxiliary unit and the simulated drive shaft, and the simulated drive shaft inertia's, polar and diametral, must be equal to each other to simulate drive shaft unbalance due to swash of engine.

Although aspects of the invention have been described with reference to the embodiments shown in the accompanying drawing, it is to be understood that the invention is not limited to this precise embodiment and that various changes and modifications may be effected without further inventive skill and effort.

What is claimed is:

1. A drive shaft balancing simulator for use in a method of balancing a rotary device for balanced rotational operation when connected to a drive shaft by a flexible coupling; the drive shaft simulator having a polar moment of inertia substantially equal to its diametral moment of inertia.

2. A drive shaft balancing simulator as claimed in claim 1, the said drive shaft simulator having substantially half the mass of the drive shaft to be simulated.

3. A method of balancing a rotary device for balanced rotational operation when connected to a drive shaft by a flexible coupling, the said method comprising the steps of:
   (a) connecting a drive shaft simulator to the said rotary device, and
   (b) rotating the said device to simulate drive shaft unbalance due to misalignment of the rotary device and the drive shaft being simulated, and due to drive shaft eccentricity and/or angular misalignment with respect to the axis of the said rotary device when the drive shaft and rotary device are connected together, wherein the said drive shaft simulator has a polar moment of inertia substantially equal to its diametral moment of inertia and is positioned with respect to the rotary device such that its centre of gravity is substantially coincident with the plane of flexibility of the flexible coupling, which in use, connects the rotary device to the drive shaft being simulated, whereby to simulate the effect of angular misalignment of the drive shaft being simulated with respect to the rotary device.

4. A method as claimed in claim 3 wherein the mass of the said drive shaft simulator is substantially half the mass of the drive shaft to be simulated, whereby to simulate the effect of drive shaft eccentricity.

5. A method as claimed in claim 3 further comprising the step of determining a balancing correction to be applied to the said rotary device for balanced operation of the said rotary device when connected to a drive shaft of the type being simulated by a flexible coupling.

6. A method as claimed in claim 1 wherein the said rotary device comprises an engine or a device to be driven by the said engine and a drive shaft of the type being simulated.

7. A method as claimed in claim 1 wherein the said rotary device comprises a gas turbine engine or engine module thereof, or an auxiliary device to be driven by the said engine and a drive shaft of the type being simulated.

8. A method of balancing a rotary device for balanced rotational operation in a rotary device and drive shaft assembly in which a drive shaft is connected to a rotary device by a flexible coupling; the said method comprising the steps of connecting a drive shaft simulator to the said rotary device; the drive shaft simulator having substantially half the mass of the drive shaft to be simulated and a polar moment of inertia substantially equal to its diametral moment of inertia, the drive shaft simulator being positioned with respect to the rotary device such that its centre of gravity is substantially coincident with the plane of flexibility of a flexible coupling, which in use, connects the rotary device to the drive shaft being simulated, whereby to determine a balancing correction to be applied to the said rotary device for balanced operation when connected to a drive shaft of the type being simulated by a flexible coupling.

* * * * *

UNITED STATES PATENT AND TRADEMARK OFFICE
CERTIFICATE OF CORRECTION

PATENT NO.   : 6,962,080 B2
DATED        : November 8, 2005
INVENTOR(S)  : William Edward Robbins It is certified that error appears in the above-identified patent and that said Letters Patent is hereby corrected as shown below:

Column 5,
Line 34, amend "UEae" to -- UEau --.

Column 6,
Line 2, amend "2EdsMs" to -- 2EdsxMs --.

Signed and Sealed this

Twenty-eighth Day of March, 2006

JON W. DUDAS
*Director of the United States Patent and Trademark Office*